United States Patent
Kosinski et al.

(10) Patent No.: US 9,507,725 B2
(45) Date of Patent: Nov. 29, 2016

(54) STORE FORWARDING FOR DATA CACHES

(71) Applicant: INTEL CORPORATION, Santa Clara, CA (US)

(72) Inventors: Steffen Kosinski, Braunschweig (DE); Fernando Latorre, Barcelona (ES); Niranjan Cooray, Folsom, CA (US); Stanislav Shwartsman, Haifa (IL); Ethan Kalifon, Nahariya (IL); Varun Mohandru, Braunschweig (DE); Pedro Lopez, Molins de Rei (ES); Tom Aviram-Rosenfeld, Tel Aviv (IL); Jaroslav Topp, Schoeppenstedt (DE); Li-Gao Zei, Braunschweig (DE)

(73) Assignee: Intel Corporation, Santa Clara, CA (US)

( * ) Notice: Subject to any disclaimer, the term of this patent is extended or adjusted under 35 U.S.C. 154(b) by 406 days.

(21) Appl. No.: 13/729,945

(22) Filed: Dec. 28, 2012

(65) Prior Publication Data
US 2014/0189250 A1 Jul. 3, 2014

(51) Int. Cl.
*G06F 12/00* (2006.01)
*G06F 12/08* (2016.01)

(52) U.S. Cl.
CPC ....... *G06F 12/0895* (2013.01); *G06F 12/0855* (2013.01); *G06F 12/0866* (2013.01)

(58) Field of Classification Search
CPC ................. G06F 12/0866; G06F 12/0855
USPC .......................... 711/113, 118–146
See application file for complete search history.

(56) References Cited

U.S. PATENT DOCUMENTS

| | | | | |
|---|---|---|---|---|
| 4,985,825 A | * | 1/1991 | Webb et al. | 711/169 |
| 5,572,702 A | * | 11/1996 | Sarangdhar et al. | 711/146 |
| 5,588,126 A | * | 12/1996 | Abramson et al. | 712/200 |
| 5,802,588 A | * | 9/1998 | Ramagopal et al. | 711/156 |
| 5,828,860 A | * | 10/1998 | Miyaoku et al. | 712/207 |
| 5,832,297 A | * | 11/1998 | Ramagopal et al. | 710/5 |
| 5,838,943 A | * | 11/1998 | Ramagopal et al. | 712/218 |
| 6,490,635 B1 | * | 12/2002 | Holmes | G06F 3/0605 710/15 |
| 7,779,307 B1 | * | 8/2010 | Favor et al. | 714/45 |
| 2005/0228951 A1 | * | 10/2005 | Peri et al. | 711/118 |
| 2006/0143377 A1 | * | 6/2006 | Mishimagi | G06F 3/0611 711/113 |
| 2013/0013843 A1 | * | 1/2013 | Radovic et al. | 711/5 |
| 2013/0145097 A1 | * | 6/2013 | Ingle et al. | 711/127 |
| 2013/0191559 A1 | * | 7/2013 | Clancy et al. | 710/55 |

* cited by examiner

*Primary Examiner* — Midys Rojas
*Assistant Examiner* — Tasnima Matin
(74) *Attorney, Agent, or Firm* — Andrews Kurth Kenyon LLP

(57) ABSTRACT

A bit or other vector may be used to identify whether an address range entered into an intermediate buffer corresponds to most recently updated data associated with the address range. A bit or other vector may also be used to identify whether an address range entered into an intermediate buffer overlaps with an address range of data that is to be loaded. A processing device may then determine whether to obtain data that is to be loaded entirely from a cache, entirely from an intermediate buffer which temporarily buffers data destined for a cache until the cache is ready to accept the data, or from both the cache and the intermediate buffer depending on the particular vector settings. Systems, devices, methods, and computer readable media are provided.

20 Claims, 6 Drawing Sheets

FIG. 2
Intermediate Buffer SAB 200
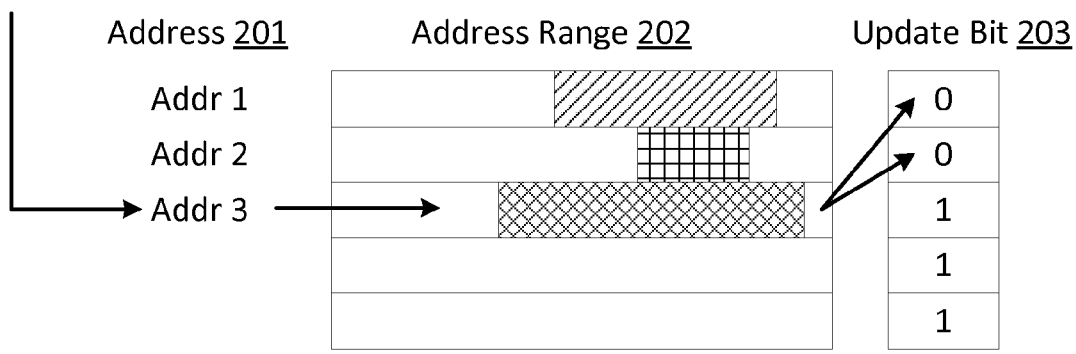

FIG. 3     Intermediate Buffer SAB 300

| Address 301 | Address Range 302 | Update Bit 303 | Overlap Bit 304 | (Update AND Overlap) Bit 305 |
|---|---|---|---|---|
| A | | | | |
| Addr A1 | | 1 | 1 | 1 |
| Addr A2 | | 1 | 0 | 0 |
| | | 1 | 0 | 0 |
| Load Addr A | | | | |
| B | | | | |
| Addr B1 | | 0 | 1 | 0 |
| Addr B2 | | 0 | 1 | 0 |
| Addr B3 | | 1 | 1 | 1 |
| Load Addr B | | | | |
| C | | | | |
| Addr C1 | | 1 | 1 | 1 |
| Addr C2 | | 1 | 1 | 1 |
| | | 1 | 0 | 0 |
| Load Addr C | | | | |
| D | | | | |
| Addr D1 | | 1 | 1 | 1 |
| Addr D2 | | 1 | 1 | 1 |
| | | 1 | 0 | 0 |
| Load Addr D | | | | |

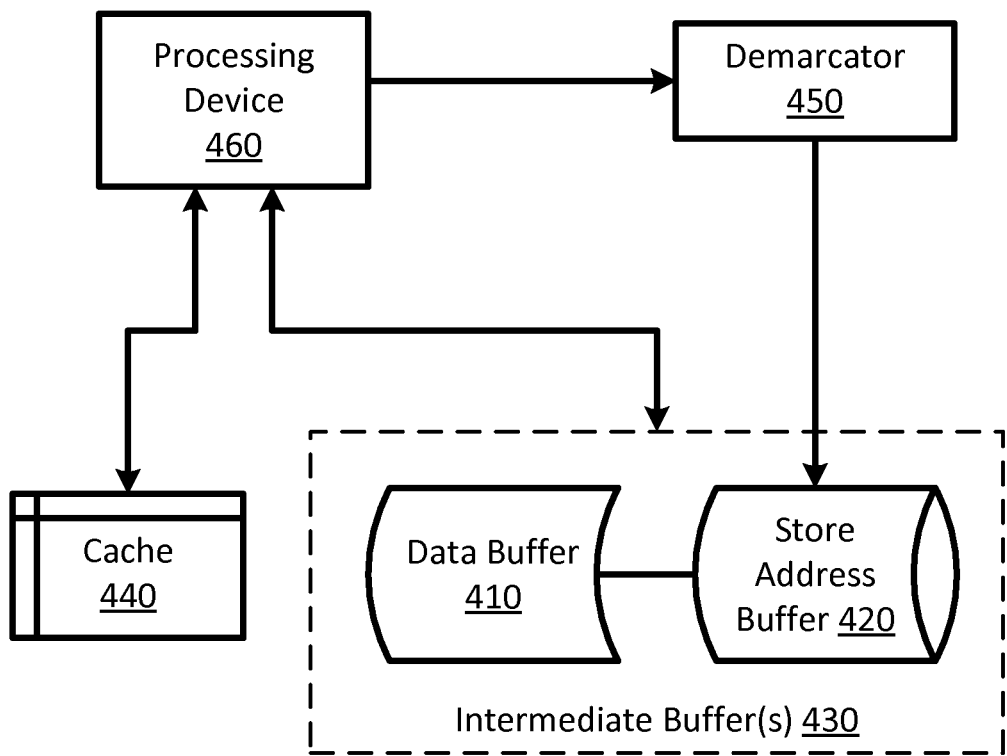

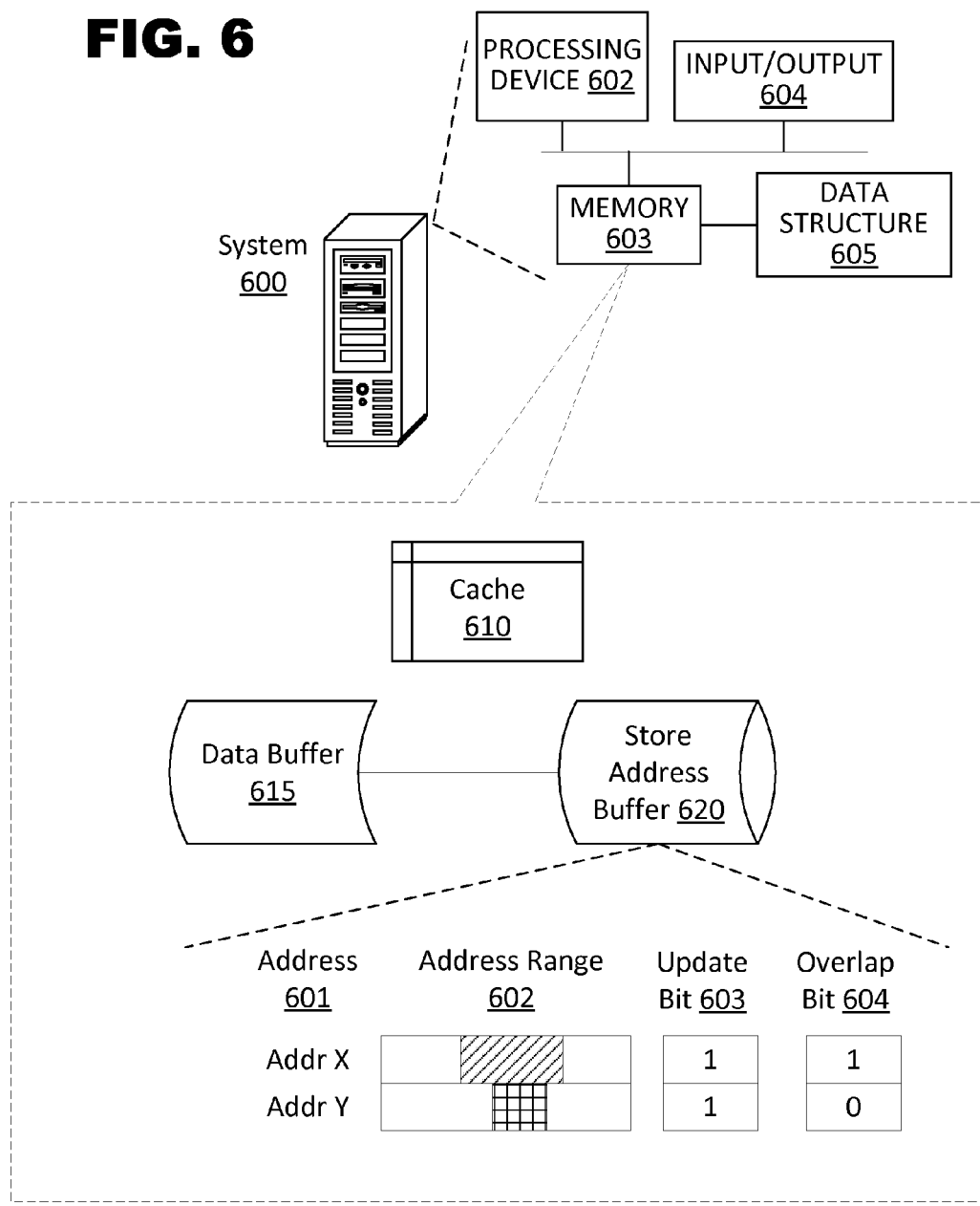

STORE FORWARDING FOR DATA CACHES

BACKGROUND

Intermediate buffers, such as store data buffers (SDBs), have been included between an execution unit, such as a processor, and a cache. These intermediate buffers have been used to temporarily store data until the cache is ready to accept the data. Overall performance has been increased by making the store execution of data independent of the data cache access. Performance is increased because of the elimination of the latency associated with continuously toggling between reading and writing operations to cache. Data from executed store operations stays in the intermediate buffer until the data cache is ready to accept the data for writing. The corresponding store addresses have been temporarily stored in an intermediate Store Address Buffer (SAB) in parallel to the intermediate SDB.

Later loads may depend (in full or in part) on data previously written to the intermediate SDB which has not yet been written in the cache. As result, every load operation checked the intermediate buffers (SAB and/or SDB) to determine whether the intermediate buffer contained data needed by the load. If the specific data was updated multiple times in the intermediate buffers, multiple entries in intermediate buffers (SAB and/or SDB) would have been returned.

Existing systems used Loosenet Blocking Check followed by Carry Chain and then Finenet Check algorithms to identify these dependencies in an intermediate buffer. If these checks indicated that current load depends on data updated in the intermediate buffer, the data would be forwarded from the intermediate buffer to the current load. Loosenet Blocking Check checked a load's untranslated address and data size to see if any older data store in the intermediate buffer has modified the data requested by the load. A loosenet block occurs when one or more older data store entries in the intermediate buffer have an address conflict or other blocking condition that blocks the load. All SAB entries independently determine if they have a blocking condition (or loosenet hit) for each address that is to be checked against the load. Index bits of the linear address identified the cache line for the loosenet check. The offset bits indicated the starting point of the access within the line. The offset together with the data size was used to calculate the end point of the load/store access. Byte resolution was used to determine whether a matched load overlaps, underlaps, or exactly matches the intermediate bufffer SDB entry.

As stated previously, Loosenet Blocking Check was done for each load against every intermediate buffer SAB entry. The resulting loosenet hit vector was then processed through a Carry Chain algorithm to identify the most recently stored data in the intermediate buffer having its data overlap with the load. Time stamps were used in the Carry Chain algorithm to locate the most recently stored data. The intermediate buffer SAB was searched for the first loosenet hit entry in reverse chronological order based on the time stamps. For simplicity, a loosenet hit bit was computed for each entry of the intermediate buffer SAB, but the load only needs to be ordered against data stored on a same thread. The loosenet hit bits on opposite threads were masked out before searching for the loosenet hit entry.

If Loosenet and Carry Chain algorithms did not find a blocking store condition for the load, the load received the data directly from the data cache. Otherwise, the linear address of the most recently stored overlapping data (as determined by the Loosenet and Carry Chain algorithms) was read from the intermediate buffer SAB and the tag bits were compared against the tag bits of the load's linear address. If the tags matched, a finenet hit was found. If the load was a subset of this finenet hit, the corresponding data in the intermediate buffer SDB that produced the finenet hit was forwarded to the load. If the load was not a subset, the load must be stalled until the blocking condition was resolved.

The Carry Chain algorithm was optimized for machines that process data out-of-order and the algorithm is not easily adaptable to in-order, stall-on-use machines having transactional memory. For example, in in-order, stall-on-use machines, the intermediate buffers SAB and SDB could be filled in order and then de-allocated out of order provided that the machine supports transactional memory. Although the out of order de-allocation frees up more memory so that additional data can be stored in the intermediate buffer, the out of order de-allocation also creates bubbles in the intermediate buffers which would cause wrong prioritization results when applying the Carry Chain algorithm. Thus, the Carry Chain algorithm is not compatible with an out of order de-allocation.

Not only is the Carry Chain algorithm not compatible with an out of order de-allocation, but the Carry Chain algorithm is also resource intensive—in current state of the art processors, processing the Carry Chain algorithm has taken up to one-fifth of the complete load loop. Designs with shorter load loops are limited due to the timing constraints associated with the Carry Chain algorithm. Finally, these existing algorithms do not support partial data store forwarding, where a first part of the requested data is taken from an intermediate buffer SDB entry and a second part is from the data cache when the requested data only partially overlaps with the corresponding data stored in the intermediate buffer. In these instances, the machine must be stalled until this condition is resolved resulting in additional processing delays.

There is a need for more efficient algorithms that enable additional data to be stored in intermediate buffers, require less resources, and support partial forwarding.

BRIEF DESCRIPTION OF THE DRAWINGS

FIG. 2 shows an example of how an update bit vector may be used in an embodiment of the invention.

FIG. 3 shows four examples of how update and overlap bit vectors may be used in an embodiment of the invention.

FIG. 4 shows an exemplary device in an embodiment of the invention.

FIG. 6 shows an exemplary system architecture in an embodiment of the invention.

DETAILED DESCRIPTION

Figure 1:
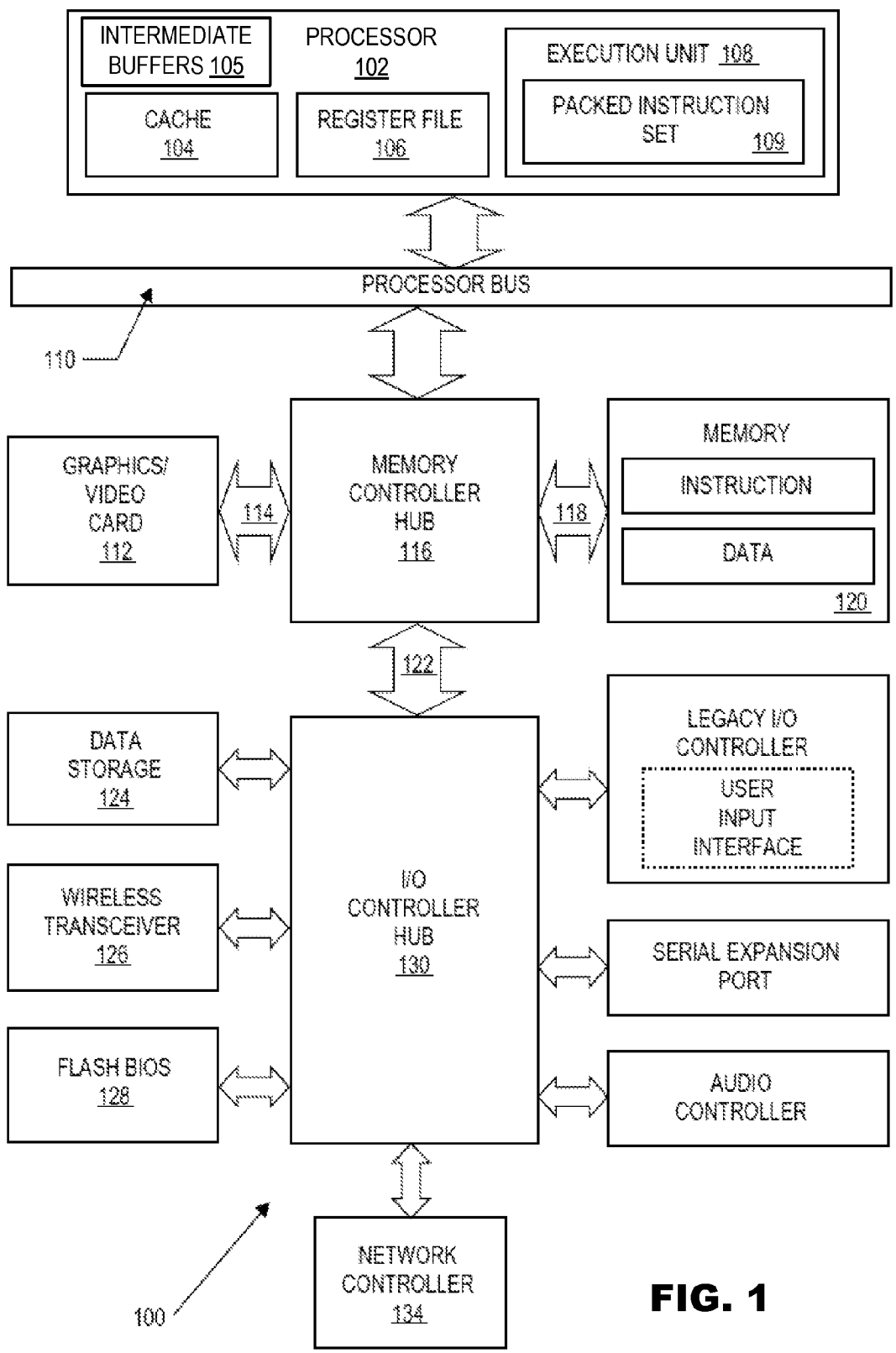
FIG. 1 shows a block diagram of a computer system in an embodiment of the invention.

In embodiments of the invention, a most recent update bit vector may be used to identify whether a store address entered into the intermediate buffer SAB corresponds to the most recently updated data associated with the address. Each SAB entry may include an additional bit containing the most recent update bit. Initially, the most recent update bit may be set to a first value (such as "1") whenever a new store address is entered into the intermediate buffer SAB. The new stored address may then be compared to the existing stored addresses in the intermediate buffer. The Loosenet check may be applied to each existing stored address in the intermediate buffer to determine whether or not each existing address overlaps, underlaps, or exactly matches the newly stored address. If an existing stored address is a complete subset of the newly stored address, which may occur when the newly stored address data completely overwrites the existing stored data, then the most recent update bit vector of the existing store address may be changed to a second value (such as "0"). This check may be conducted for each intermediate buffer SAB entry in parallel.

When a request to load address data is processed, an overlap check may be performed against all entries in the intermediate buffer SAB. The address of the data to be loaded may be compared to each of the address entries in the intermediate buffer SAB. When the address to be loaded at least partially overlaps with an entry in the intermediate buffer SAB, then the overlap bit vector associated with the entry in the intermediate buffer SAB may be set to a first value. When the address to be loaded does not overlap, the overlap bit vector may be set to a second value. Thus, for every existing entry in the intermediate buffer SAB that at least partially overlaps or does not overlap at all with the address to be loaded, a bit may be set in the overlap (Ovlp) vector to a corresponding value. For example, Ovlp[i]= (BE_load & BE_SAB[i]==BE_load[i]), where 'i' is the iterator through the intermediate buffer SAB entries. The Loosenet and Finenet algorithms may also be applied to the intermediate buffer SAB entries in parallel to the overlap check in some instances.

Once the overlap and most recent update bit vectors are configured as set forth above, the two vectors in each entry may be compared, such as by performing a bit-wise AND operation on the overlap and most update vectors. If the resulting vector from the AND operation has exactly one bit set, the data in the intermediate buffer associated with the entry in the intermediate buffer SAB with the one bit set may be forwarded to the load.

A store byte mask may also be used to select the particular bytes that are forwarded to the load. The store byte mask may enable partial forwarding from both the intermediate buffer SDB and the data cache, which is not possible with the conventional Loosenet/Finenet algorithm. Additionally, the use of the bit vectors as discussed above eliminates the need to both prioritize any overlap data update entries in the intermediate buffer and find the most recently updated overlapping data in the intermediate buffer through a Carry Chain algorithm.

The need to stall in order to resolve a conflict is also reduced in embodiments of the invention because stalling is limited to cases in which both the overlap and most recent update bits are set in two or more intermediate buffer entries. If this condition occurs, then two or more intermediate buffer entries may include different updates to the data. In this situation, the process may be stalled until a secondary conflict resolution process is able to resolve the order in which data is to be processed and updated before being provided to the load. In other situations in which no bits or exactly one bit is set in the overlap and most recent update bit vectors, then either some data forwarding or no data forwarding from the intermediate buffer may be performed as described above. As a result, the need to stall in order to perform a slower secondary conflict resolution process occurs much less frequently and overall performance may be improved.

FIG. 1 shows a block diagram of a computer system 100 formed with a processor 102 that includes one or more execution units 108 to perform an algorithm to perform at least one instruction in accordance with one embodiment of the present invention. One embodiment may be described in the context of a single processor desktop or server system, but alternative embodiments can be included in a multiprocessor system. System 100 is an example of a 'hub' system architecture. The computer system 100 includes a processor 102 to process data signals. The processor 102 can be a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 102 is coupled to a processor bus 110 that can transmit data signals between the processor 102 and other components in the system 100. The elements of system 100 perform their conventional functions that are well known to those familiar with the art.

In one embodiment, the processor 102 includes a Level 1 (L1) internal cache memory 104. Depending on the architecture, the processor 102 can have a single internal cache or multiple levels of internal cache. Alternatively, in another embodiment, the cache memory can reside external to the processor 102. Other embodiments can also include a combination of both internal and external caches depending on the particular implementation and needs. Register file 106 can store different types of data in various registers including integer registers, floating point registers, status registers, and instruction pointer register.

In an embodiment, the processor 102 may include one or more intermediate buffers 105 that may store data destined for a cache until the cache is ready to accept the data. These intermediate buffers 105 may include a data buffer storing the actual data destined for the cache and a store address buffer storing addresses of the data in the data buffer.

Execution unit 108, including logic to perform integer and floating point operations, also resides in the processor 102. The processor 102 also includes a microcode (ucode) ROM that stores microcode for certain macroinstructions. For one embodiment, execution unit 108 includes logic to handle a packed instruction set 109. By including the packed instruction set 109 in the instruction set of a general-purpose processor 102, along with associated circuitry to execute the instructions, the operations used by many multimedia applications may be performed using packed data in a general-purpose processor 102. Thus, many multimedia applications can be accelerated and executed more efficiently by using the full width of a processor's data bus for performing operations on packed data. This can eliminate the need to transfer smaller units of data across the processor's data bus to perform one or more operations one data element at a time.

Alternate embodiments of an execution unit 108 can also be used in micro controllers, embedded processors, graphics devices, DSPs, and other types of logic circuits. System 100 includes a memory 120. Memory 120 can be a dynamic random access memory (DRAM) device, a static random access memory (SRAM) device, flash memory device, or other memory device. Memory 120 can store instructions and/or data represented by data signals that can be executed by the processor 102.

A system logic chip 116 is coupled to the processor bus 110 and memory 120. The system logic chip 116 in the illustrated embodiment is a memory controller hub (MCH). The processor 102 can communicate to the MCH 116 via a processor bus 110. The MCH 116 provides a high bandwidth memory path 118 to memory 120 for instruction and data storage and for storage of graphics commands, data and textures. The MCH 116 is to direct data signals between the processor 102, memory 120, and other components in the system 100 and to bridge the data signals between processor bus 110, memory 120, and system I/O 122. In some embodiments, the system logic chip 116 can provide a graphics port for coupling to a graphics controller 112. The MCH 116 is coupled to memory 120 through a memory interface 118. The graphics card 112 is coupled to the MCH 116 through an Accelerated Graphics Port (AGP) interconnect 114.

System 100 uses a proprietary hub interface bus 122 to couple the MCH 116 to the I/O controller hub (ICH) 130. The ICH 130 provides direct connections to some I/O devices via a local I/O bus. The local I/O bus is a high-speed I/O bus for connecting peripherals to the memory 120, chipset, and processor 102. Some examples are the audio controller, firmware hub (flash BIOS) 128, wireless transceiver 126, data storage 124, legacy I/O controller containing user input and keyboard interfaces, a serial expansion port such as Universal Serial Bus (USB), and a network controller 134. The data storage device 124 can comprise a hard disk drive, a floppy disk drive, a CD-ROM device, a flash memory device, or other mass storage device.

For another embodiment of a system, an instruction in accordance with one embodiment can be used with a system on a chip. One embodiment of a system on a chip comprises of a processor and a memory. The memory for one such system is a flash memory. The flash memory can be located on the same die as the processor and other system components. Additionally, other logic blocks such as a memory controller or graphics controller can also be located on a system on a chip FIG. 2 shows an example of how a most recent update bit vector may be used in an embodiment of the invention. A store address buffer 200 in an intermediate buffer between the processing device and a cache may store one or more data addresses 201. For illustrative purposes, an exemplary range of these addresses 202 is also shown. The most recent update bit vector 203 may be included for each of the address 201 stored in the buffer 200. In some instances, the bit vector 203 may be appended to the end of each address entry stored in the buffer 200. The update bit vector 203 may be set to "1" to indicate that the entry corresponds to a most recently updated address and may be set to "0" to indicate that the entry has been entirely overwritten by another address entry added to the buffer after the entry. The update bit vector 203 may be updated each time a new address or address range is added to the buffer 200.

At time t1, addresses Addr1 and Addr2 are written to the buffer 200. In this examples shown here, each of the addresses are added chronologically, so for example, Addr1 is added first, followed by Addr2, and so on to illustrate general concepts. In practice, as discussed herein, addresses may be added and then deleted from the buffer 200 when they are no longer needed, so it is possible that addresses may be added to and deleted from the buffer 200 non-sequentially. Since the address range 202 of Addr2 does not encompass the entire range address Addr1, but only a subset, both Addr1 and Addr2 are associated with at least some most recently updated data. Thus, while Addr2 partially overlaps with the previously added Addr1, there is still a non-overlapping portion of Addr1 that is not updated by Addr2. Accordingly, the update bit vector 203 for each of Addr1 and Addr2 remains set to "1" to indicate that each address Addr1 and Addr2 corresponds to a most recently updated address.

At time t2, a new address Addr3 may be added to the store address buffer 200. As shown in FIG. 2, the range 202 of addresses included in Addr3 may wholly encompass the range of both Addr1 and Addr2. As a result, each of the addresses included in Addr1 and Addr2 will be entirely superceded with the data associated with Addr3. Addr3 therefore corresponds to the most recently updated data associated with the addresses in both Addr1 and Addr2. Since Addr1 and Addr2 are no longer associated with the most recent data for their respective addresses, the update bit vector 203 for Addr1 and Addr2 may be changed to a "0."

FIG. 3 shows four examples, A to D, of how most recently update 303 and overlap 304 bit vectors may be used in an embodiment of the invention when loading data at particular addresses. In example A, data associated with address AddrA is to be loaded. The address range 302 for AddrA partially overlaps with addresses 301 of AddrA1 previously stored in store address buffer 300, but does not overlap with AddrA2 also previously stored in buffer 300. As a result of this at least partial overlap, the overlap bit vector 304 for AddrA1 is set to "1", indicating an at least partial overlap with an address to be loaded, while the overlap bit vector 304 for AddrA2 is set to "0", indicating no overlap with the address to be loaded.

The update bit vector 303 is set to "1" for both AddrA1 and AddrA2 since neither of these addresses have been completely overwritten by an address range later added to the buffer 300. The update bit vector 303 may be set by default to "1" and the overlap bit vector may be set by default to "0." In example A, only AddrA1 has both 305 its update bit vector 303 and its overlap bit vector 304 set to "1". In this case, some of the data associated with address AddrA1 may be forwarded to the load and the rest may be obtained from the cache.

In example B, the third address AddrB3 written to buffer 300 completely overwrites the prior addresses AddrB1 and AddrB2 previously written to the buffer 300. In this example B, since AddrB3 completely overwrites addresses AddrB1 and AddrB2, the update bit vector 303 for AddrB1 and AddrB2 may set to "0" while the update bit vector 303 for AddrB3 may remain set at "1" since it is associated with the most recently updated data for the addresses in this address range 302.

Additionally, as shown in example B, the address data AddrB to be loaded at least partially overlaps with each of the addresses in AddrB1, AddrB2, and AddrB3. The overlap bit vector 304 may therefore be set to "1" for each of the addresses. In example B, only AddrB3 has both 305 its update bit vector 303 and its overlap bit vector 304 set to "1". In this case, since the address to be loaded AddrB completely overlaps with the address in AddrB3, the data associated with AddrB3 may be forwarded to the load.

In example C, the data associated with second address range AddrC2 written to buffer 300 partially overwrites the data associated with prior address range AddrC1 previously written to the buffer 300. In this example C, since AddrC2 only partially overwrites AddrC1, the update bit vector 303 for both AddrC1 and AddrC2 may set to "1" since they are each associated with at least some most recently updated data for the addresses in their respective address ranges 302.

Additionally, as shown in example C, the address data AddrC to be loaded at least partially overlaps with each of the addresses in AddrC1 and AddrC2. The overlap bit vector 304 may therefore be set to "1" for each of the addresses. In example C, therefore, AddrC1 and AddrC2 both have their update bit vector 303 and overlap bit vector 304 set to "1" 305. In this case, a conflict may arise as to which data associated with either AddrC1 or AddrC2 should be supplied to the load. This conflict may arise because embodiments of the invention need not track the order in which data is written to intermediate buffers such as the store address buffer 300 and/or data buffer. As a result, a secondary conflict resolution process may be initiated to identify an order in which the data associated with the address was loaded into the buffer and/or identify the most recent data that should be supplied to the load.

In example D, the data associated with second address range AddrD2 written to buffer 300 partially overwrites the data associated with prior address range AddrD1 previously written to the buffer 300. In this example D, since AddrD2 only partially overwrites addresses AddrD1, the update bit vector 303 for both AddrD1 and AddrD2 may set to "1" since they are each associated with at least some most recently updated data for the addresses in their respective address ranges 302.

Additionally, as shown in example D, the address data AddrD to be loaded overlaps with each of the addresses in AddrD1 and AddrD2. The overlap bit vector 304 may therefore be set to "1" for each of the addresses. In example D, therefore, AddrD1 and AddrD2 both have their update bit vector 303 and overlap bit vector 304 set to "1" 305. In this case, a conflict may arise as to which data associated with either AddrD1 or AddrD2 should be supplied to the load. This conflict may arise because embodiments of the invention need not track the order in which data is written to intermediate buffers such as the store address buffer 300 and/or data buffer. As a result, a secondary conflict resolution process may be initiated to identify an order in which the data associated with the address was loaded into the buffer and/or identify the most recent data that should be supplied to the load.

Removing the ability to track the order in which data is written to the intermediate buffer may significantly improve performance and timing. For example, in some embodiments, timing improvements may save one complete cycle during a load loop. Additionally, in some embodiments, memory operations, such as the loading of data from specific addresses, may miss or bypass the intermediate buffer altogether. This situation may occur when there is not at least one most recently updated memory address in the store address buffer that overlaps a memory address associated with the memory operation. In some embodiments, when this situation occurs, the addresses stored in the intermediate buffer may be re-checked. This re-checking may occur on a separate background pipeline.

Even though memory operations associated with addresses that miss or bypass the intermediate buffer may be re-checked, the data flow associated with the memory operation need not be altered. Instead, the data may be kept in the data buffer until miss handling is complete and the rechecked memory operation is performed. In order to allow data forwarding for rechecked data load requests, for example, an additional update bit vector, such as a second update bit vector, may be used. The second update bit vector may function similarly to the original update bit vector described earlier, the main difference being that rechecked addresses may only update the second update bit vector instead of the original update bit vector. Additionally, during the re-checking process, loads may only use the second update bit vector to identify buffered data for forwarding. The second update bit vector may prevent re-checking process from conflicting with initial process. Additionally, the forwarding of erroneous data from a cache of buffered data associated with addresses that miss or bypass the intermediate buffer during a first iteration but have not been rechecked is prevented.

FIG. 4 shows an exemplary embodiment of a device 400 in an embodiment of the invention. A device 400, such as a memory device, may include one or more intermediate buffers 430, a cache 440, a demarcator 450, and a processing device 460. Intermediate buffers 430 may include a data buffer 410 and store address buffer 420.

The data buffer 410 may store data destined for the cache 440 until the cache 440 is ready to accept the data. The store address buffer 420 may store addresses of data stored in the data buffer 410.

The demarcator 450 may identify those addresses in the store address buffer 420 at least partially overlapping with an address to be loaded. The demarcator 450 may also identify whether or not each respective address in the store address buffer 420 has been overwritten by an address added to the store address buffer 420 after the respective address. The demarcator 450 may identify a respective address range as not overwritten when the respective address range is only partially overwritten by a later added address range. Each address range may include a single address or it may include two or more addresses.

The processing device 460 may load data from the cache 440 when no addresses are identified as overlapping by the demarcator 450. The processing device 460 may load at least a subset of the data from the data buffer 410 when only one address range in the store address buffer 420 is identified as both overlapping and as not having been overwritten by a later added address range. The processing device 460 may execute a secondary conflict resolution procedure to identify data to be loaded when at least two address ranges in the store address buffer are identified by the demarcator 450 as both overlapping and as not having been overwritten by later added address ranges. The processing device 460 may also stall other operations until the secondary conflict resolution procedure is complete.

Figure 5:
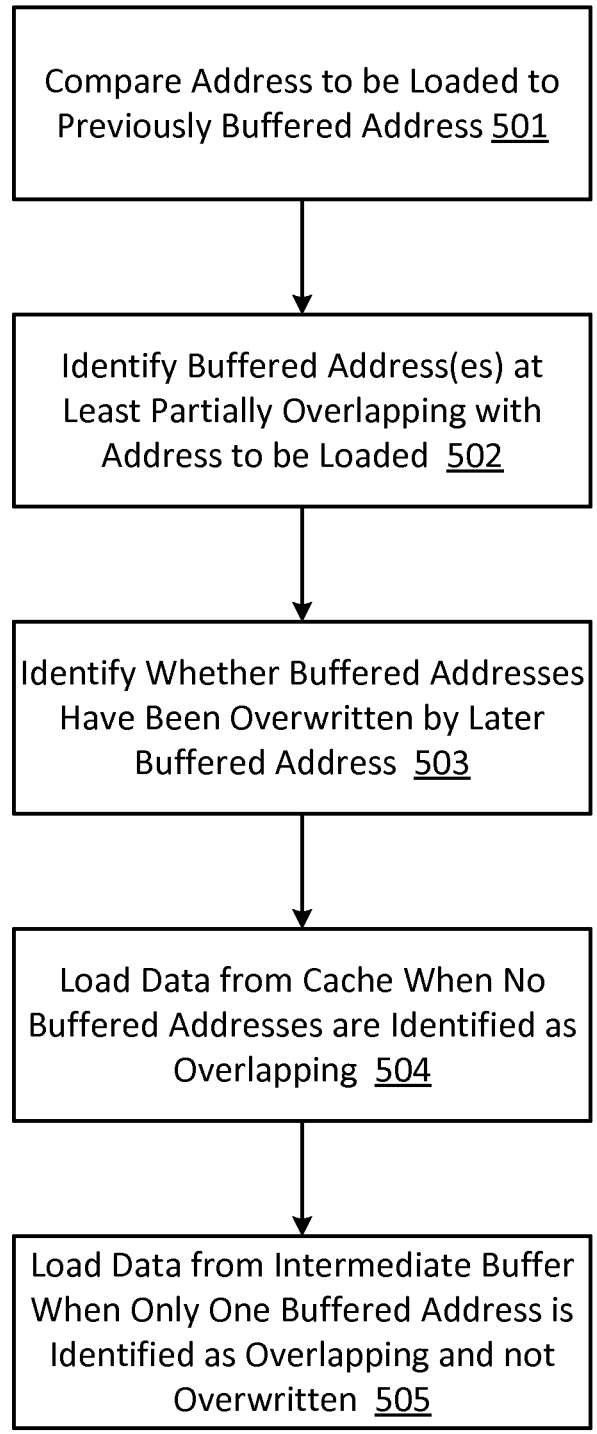
FIG. 5 shows an exemplary process in an embodiment of the invention.

FIG. 5 shows an exemplary process in an embodiment of the invention. Each of the processes described in FIG. 5 and elsewhere may be included as instructions on a computer readable medium, such as memory, hard drive, solid state drive, compact disc, digital video disc, flash memory, random access memory (RAM), or other types of media that are readable by a computer or processing device. These instructions may, when executed by a processing device, cause the processing device to perform a process associated with the instructions.

In box 501, an address range of data to be loaded may be compared to a plurality of address ranges temporarily stored in an intermediate buffer until a cache is ready to accept data associated with the buffered addresses.

In box 502, those buffered address ranges, if any, at least partially overlapping with the address range to be loaded may be identified using a processing device.

In box 503, a processing device may be used to identify whether each of the buffered address ranges has been overwritten by an address range added to the intermediate buffer after the respective buffered store address range.

In box 504, data associated with the address range to be loaded may be loaded from the cache when no address ranges are identified as overlapping.

In box 505 at least a subset of the data associated with the address range to be loaded may be loaded from the intermediate buffer when only one of the address ranges is identified as both overlapping and not overwritten. In some instances, the data may be loaded entirely from the intermediate buffer when the only one address range identified as both overlapping and not overwritten completely overlaps the address range to be loaded. In other instances, data may be loaded partially from the intermediate buffer and partially from the cache when the only one store address identified as both overlapping and not overwritten only partially overlaps the address range to be loaded. The data loaded from the intermediate buffer may correspond to the partially overlapping address range and any remaining data may be loaded from the cache.

In some instances, boxes 501 to 505 may be repeated when no address ranges are identified as overlapping before any data associated with the address range to be loaded is loaded from the cache.

In some instances, the loading of data may be stalled when more than one of the buffered address ranges is identified as both overlapping and not overwritten. In these instances, a sequence in which address ranges are buffered may be retrieved. An order in which information associated with the address range to be loaded is stored in the intermediate buffer may be identified from the sequence. Most recently updated data from the intermediate buffer may then loaded based on the identified order.

In some instances, a first bit vector and a second bit vector may be added to each address range stored in the intermediate buffer. The first bit vector may be set to a first value to indicate that a respective buffered address range has not been overwritten by an address range added to the intermediate buffer after the respective buffered address range. The second bit vector may be set to a second value to indicate that the respective buffered address range at least partially overlaps with the address range to be loaded. Data may be loaded only from the intermediate buffer when at least one buffered address range has the first vector set to the first value and the second vector set to the second value. In some instances, the first value and the second value may, but need not be a same value, such as a "1."

FIG. 6 shows an exemplary architecture of a system 600 in an embodiment of the invention. System 600 may include a cache 610, a data buffer 615, and a store address buffer 620. The cache 610 and buffers 615 and 620 may be part of memory 603.

The data buffer 615 may store data destined for the cache 610 until the cache is ready to accept the data.

The store address buffer 620 may store, for each data entry stored in the data buffer: (i) an address range associated with the data entry, (ii) a first vector, and (iii) a second vector. The first vector may be set to a first value when a respective address range associated with a respective data entry has not been overwritten by an address range added to the store address buffer after the respective address range. Otherwise the first vector may be set to a different value from the first value. The second vector may be set to a second value when the respective address range at least partially overlaps with an address range of data to be loaded. Otherwise the second vector may be set to a different value. The first and second vectors may, but need not, be bit vectors.

A processing device 602 in system 600 may be configured to load, transmit, or forward data that is to be loaded for use by a particular program or instruction from the cache when the first and the second vectors are not set to the respective first and second values for any of the address ranges in the store address buffer. The processing device 602 may also be configured to load, transmit, or forward the data that is to be loaded at least in part from the data buffer when the first and the second vectors are set to the respective first and second values for only one of the address ranges in the store address buffer. The processing device 602 may be configured to execute a secondary conflict resolution procedure to identify the data to be loaded when the first and the second vectors are set to the respective first and second values for at least two of the address ranges in the store address buffer.

System 600 may also contain a processing device 602, memory 603 storing loaded data or a loaded data structure 605, and a communications device 604, all of which may be interconnected via a system bus. In various embodiments, system 600 may have an architecture with modular hardware and/or software systems that include additional and/or different systems communicating through one or more networks.

Communications device 604 may enable connectivity between the processing devices 602 in system 600 and that of other systems (not shown) by encoding data to be sent from the processing device 602 to another system and decoding data received from another system for the processing device 602.

In an embodiment, memory 603 may contain different components for retrieving, presenting, changing, and saving data. Memory 603 may include a variety of memory devices, for example, Dynamic Random Access Memory (DRAM), Static RAM (SRAM), flash memory, cache memory, and other memory devices. Additionally, for example, memory 603 and processing device(s) 602 may be distributed across several different computers that collectively comprise a system.

Processing device 602 may perform computation and control functions of a system and comprises a suitable central processing unit (CPU). Processing device 602 may include a single integrated circuit, such as a microprocessing device, or may include any suitable number of integrated circuit devices and/or circuit boards working in cooperation to accomplish the functions of a processing device. Processing device 602 may execute computer programs, such as object-oriented computer programs, within memory 603.

The foregoing description has been presented for purposes of illustration and description. It is not exhaustive and does not limit embodiments of the invention to the precise forms disclosed. Modifications and variations are possible in light of the above teachings or may be acquired from the practicing embodiments consistent with the invention. For example, the data buffer 615 and store address buffer 620 may be part of a single buffer or they may each be physically separate buffers.

We claim:

1. A memory device comprising:
   a data buffer storing data destined for a cache until the cache is ready to accept the data;
   a store address buffer storing addresses of data stored in the data buffer, wherein the addresses are stored as address entries in the store address buffer, and wherein each address entry includes an address range;
   a demarcator to identify (i) those address entries in the store address buffer that include an address range at least partially overlapping with an address of data to be loaded and (ii) whether or not the address range of each respective address entry in the store address buffer has been overwritten by an address range of a later added address entry; and
   a processing device to load at least a subset of data from the data buffer instead of the cache if only one address entry in the store address buffer is identified as both having an overlapping address range and as not having its address range been overwritten.

2. The memory device of claim 1, wherein the demarcator identifies a respective address range as not overwritten if the respective address range is only partially overwritten by an address range of a later added address entry.

3. The memory device of claim 1, wherein the address range of at least one of the address entries is a single address.

4. The memory device of claim 1, wherein the address range of at least one of the address entries includes a plurality of addresses.

5. The memory device of claim 1, wherein the processing device (i) executes a secondary conflict resolution procedure to identify data to be loaded if at least two address entries in the store address buffer are each identified as both having an overlapping address range and as not having its address range been overwritten by an address range of a later added address entry, and (ii) stalls other operations until the secondary conflict resolution procedure is complete.

6. A method comprising:
    comparing an address range of data to be loaded to address ranges of a plurality of address entries, wherein the address entries are temporarily stored in an intermediate buffer together with associated data until a cache is ready to accept the associated data;
    identifying those address entries, if any, that have an address range at least partially overlapping with the address range of the data to be loaded, using a processing device;
    identifying whether each of the address entries includes an address range that has been overwritten by an address range of a later added address entry;
    loading the data to be loaded from the cache if no address entries are identified as having an overlapping address range; and
    loading at least a subset of the data to be loaded from the intermediate buffer if only one of the address entries is identified as both having an overlapping address range and not having its address range been overwritten.

7. The method of claim 6, further comprising, loading the data to be loaded entirely from the intermediate buffer if the address range of the only one address entry identified as both having an overlapping address range and not having its address range been overwritten completely overlaps the address range of the data to be loaded.

8. The method of claim 6, further comprising, loading the data to be loaded partially from the intermediate buffer and partially from the cache if the address range of the only one address entry identified as both having an overlapping address range and not having its address range been overwritten only partially overlaps the address range of the data to be loaded.

9. The method of claim 8, further comprising, loading data corresponding to the partially overlapping address range from the intermediate buffer and loading any remaining portions of the data to be loaded from the cache.

10. The method of claim 6, further comprising:
    stalling the loading of the data to be loaded if more than one of the address entries is identified as both having an overlapping address range and not having its address range been overwritten;
    retrieving a sequence in which address entries are buffered;
    identifying from the sequence an order in which the data to be loaded is stored in the intermediate buffer; and
    loading most recently updated data from the intermediate buffer based on the identified order.

11. The method of claim 6, further comprising, repeating the method if no address entries are identified as having an overlapping address range, before loading the data to be loaded from the cache.

12. The method of claim 6, further comprising:
    adding a first bit vector and a second bit vector to each address entry stored in the intermediate buffer;
    setting the first bit vector to a first value to indicate that a respective address range has not been overwritten by an address range of a later added address entry; and
    setting the second bit vector to a second value to indicate that the respective address range at least partially overlaps with the address range of the data to be loaded.

13. The method of claim 12, further comprising, only loading data from the intermediate buffer if at least one address entry has the first vector set to the first value and the second vector set to the second value.

14. The method of claim 12, wherein the first value and the second value are a same value.

15. A non-transitory computer readable medium storing instructions that, when executed by a processing device, cause the processing device to:
    compare an address range of data to be loaded to a plurality of address ranges of address entries, wherein the address entries are temporarily stored in an intermediate buffer together with associated data until a cache is ready to accept the associated data;
    identify those address entries, if any, that have an address range at least partially overlapping with the address range of the data to be loaded;
    identify whether the address range of each of the address entries has been overwritten by an address range of a later added address entry;
    load the data to be loaded from the cache if no address entries are identified as having an overlapping address range; and
    load at least a subset of the data to be loaded from the intermediate buffer if only one of the address entries is identified as both having an overlapping address range and not having its address range been overwritten.

16. The non-transitory computer readable medium of claim 15, further comprising additional instructions that, when executed by the processing device, cause the processing device to:
    set a first bit vector added to each address entry in the intermediate buffer to a first value to indicate that a respective address range has not been overwritten by an address range of a later added address entry;
    set a second bit vector added to each address entry in the intermediate buffer to a second value to indicate that the respective address range at least partially overlaps with the address range of the data to be loaded; and
    load data from the intermediate buffer if at least one address entry has the first vector set to the first value and the second vector set to the second value.

17. The non-transitory computer readable medium of claim 15, wherein the intermediate buffer includes a data buffer storing the data associated with the address entries and a store address buffer storing the address entries.

18. A system comprising:
    a cache;
    a data buffer storing data destined for a cache until the cache is ready to accept the data;
    a store address buffer storing, for each data entry stored in the data buffer, an associated address entry, a first vector, and a second vector, wherein the first vector is set to a first value if an address range of a respective address entry has not been overwritten by an address range of a later added address entry, and wherein the second vector is set to a second value if the address range of the respective address entry at least partially overlaps with an address range of data to be loaded; and a processing device configured to load the data to be loaded: (i) from the cache if the first and the second vectors are not set to the respective first and second values for any of the address entries in the store address buffer and (ii) at least in part from the data buffer if the first and the second vectors are set to the respective first and second values for only one of the address entries in the store address buffer.

19. The system of claim 18, wherein the first and second vectors are bit vectors.

20. The system of claim 18, wherein the processing device is further configured to execute a secondary conflict resolution procedure to identify the data to be loaded if the first and the second vectors are set to the respective first and second values for at least two of the address entries in the store address buffer.

* * * * *